(12) United States Patent
Prestenback et al.

(10) Patent No.: US 11,582,507 B2
(45) Date of Patent: Feb. 14, 2023

(54) METHODS AND APPARATUSES FOR COMBINING AND DISTRIBUTING USER ENHANCED VIDEO/AUDIO CONTENT

(71) Applicant: Disney Enterprises, Inc., Burbank, CA (US)

(72) Inventors: Kyle Prestenback, Burbank, CA (US); Evan Tahler, Burbank, CA (US); Brian Kwan, Pasadena, CA (US); David Jessen, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 903 days.

(21) Appl. No.: 16/450,032

(22) Filed: Jun. 24, 2019

(65) Prior Publication Data

US 2019/0313148 A1 Oct. 10, 2019

Related U.S. Application Data

(63) Continuation of application No. 12/239,596, filed on Sep. 26, 2008, now abandoned.

(60) Provisional application No. 61/059,510, filed on Jun. 6, 2008.

(51) Int. Cl.
| | | |
|---|---|---|
| H04N 21/432 | (2011.01) | |
| H04N 7/173 | (2011.01) | |
| H04N 21/2743 | (2011.01) | |
| H04N 21/44 | (2011.01) | |
| H04N 21/458 | (2011.01) | |
| H04N 21/472 | (2011.01) | |
| H04N 21/4788 | (2011.01) | |
| H04N 21/845 | (2011.01) | |
| H04N 21/43 | (2011.01) | |

(52) U.S. Cl.
CPC ..... *H04N 21/4325* (2013.01); *H04N 7/17318* (2013.01); *H04N 21/2743* (2013.01); *H04N 21/43072* (2020.08); *H04N 21/44016* (2013.01); *H04N 21/458* (2013.01); *H04N 21/4788* (2013.01); *H04N 21/47202* (2013.01); *H04N 21/8455* (2013.01)

(58) Field of Classification Search
CPC .......... H04N 21/4325; H04N 7/17318; H04N 21/2743; H04N 21/43072; H04N 21/44016; H04N 21/458; H04N 21/47202; H04N 21/4788; H04N 21/8455
See application file for complete search history.

(56) References Cited

U.S. PATENT DOCUMENTS

| | | | | |
|---|---|---|---|---|
| 8,819,719 | B1 * | 8/2014 | Chen | H04N 7/173 |
| 2008/0281592 | A1 * | 11/2008 | Mckoen | G06F 3/14 |
| 2008/0282191 | A1 * | 11/2008 | Branam | G06F 3/048 |
| 2009/0276802 | A1 * | 11/2009 | Amento | H04N 7/025 |

* cited by examiner

*Primary Examiner* — Anthony Bantamoi
(74) *Attorney, Agent, or Firm* — Patterson + Sheridan, LLP

(57) ABSTRACT

Methods and apparatuses are provided, which may be implemented to combine and distribute user enhanced video and/or audio content.

20 Claims, 6 Drawing Sheets

METHODS AND APPARATUSES FOR COMBINING AND DISTRIBUTING USER ENHANCED VIDEO/AUDIO CONTENT

RELATED APPLICATIONS

This patent application is a Continuation of U.S. patent application Ser. No. 12/239,596, filed on Sep. 26, 2008, entitled METHODS AND APPARATUSES FOR COMBINING AND DISTRIBUTING USER ENHANCED VIDEO/ AUDIO CONTENT, which claimed the benefit of, and priority to, U.S. Provisional Patent Application Ser. No. 61/059,510, filed on Jun. 6, 2008, and titled "Methods And Apparatuses For Combining And Distributing User Enhanced Video/Audio Content," all of which are hereby incorporated by reference in their entireties.

BACKGROUND

1. Field

The subject matter disclosed herein relates to video and/or audio data content processing, and more particularly to methods and apparatuses for use in combining and distributing user enhanced video/audio content.

2. Information

Electronic entertainment systems continue to advance in sophistication and popularity. Standard definition televisions are being replaced with higher definition video monitor devices and high fidelity audio monitor devices in an attempt to provide an improved entertainment experience. Likewise, standard definition video tape players and/or DVD player devices are being replaced with higher definition optical disc player devices, such as, for example, Blu-Ray disc player devices. Furthermore, content establishing devices, such as web cameras, video cameras, still image cameras, sound recording devices, etc., are also being replaced or upgraded to provide higher definition content.

Computing and communication systems and networks also continue to advance in sophistication and popularity. The Internet and related computing and communication infrastructure, for example, continues to improve and expand in content, access, speed, variety, etc. Electronic entertainment systems may be further enhanced by interfacing with such networked resources. By way of example, certain set-top boxes may be adapted to access networked resources and provide information and/or content received there from for use in an electronic entertainment system. Some set-top boxes may also be adapted to allow for information and/or content to be provided from one or more devices in an electronic entertainment system to one or more networked resources.

The sharing and distribution of content, and in particular video/audio content continues to increase as more and more users upload and download such content to and from various network resource devices.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
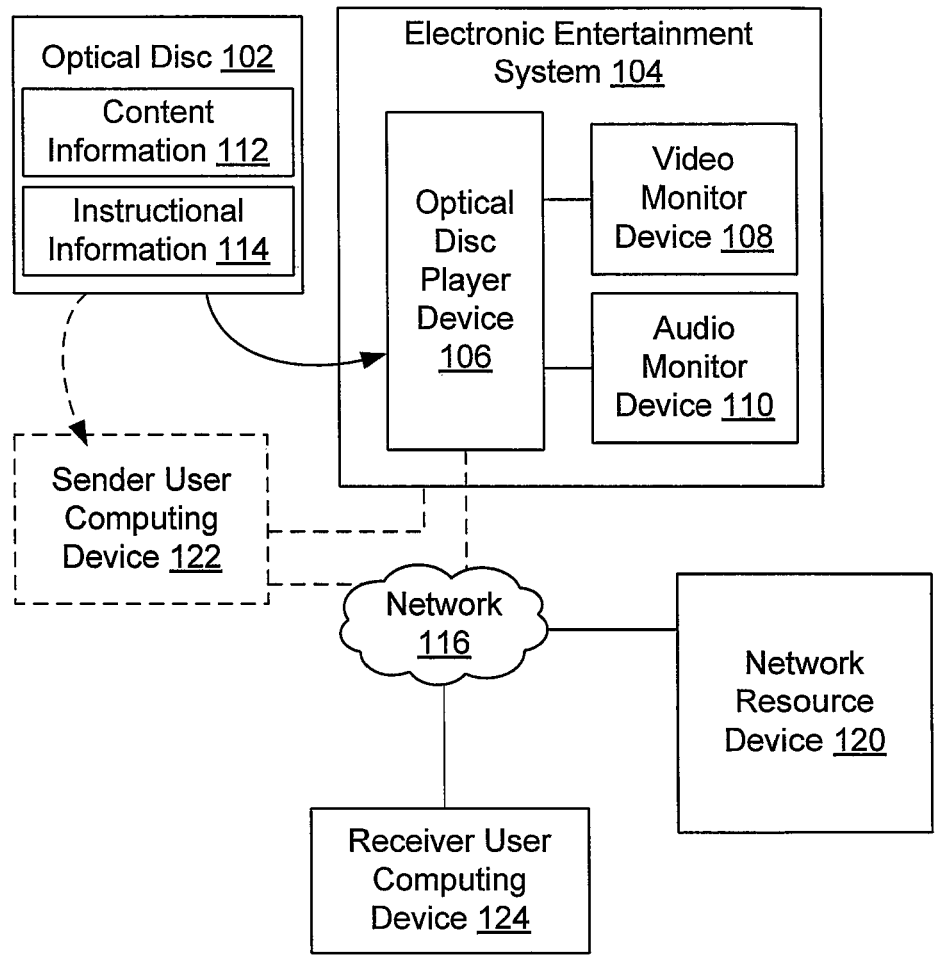
FIG. 1 is a block diagram illustrating an exemplary implementation of a computing environment that includes various networked computing devices and an electronic entertainment system adapted for use in combining and distributing user enhanced video/audio content.

In accordance with certain aspects, some exemplary methods and apparatuses are presented below that may be adapted for use in an electronic environment that may support community-based creation, distribution, and playback of combined content.

Such exemplary methods and apparatuses may, for example, be adapted to provide or otherwise support a community of users having the ability to insert video messages and overlays to enhance or otherwise augment the electronic entertainment experience. Such ability may be used in both an interpersonal messaging sense, and a larger group publishing sense.

In the following sections, certain implementations and aspects are presented which may be adapted to provide for an integrated system that includes the video creation, the video storage, the video transmission, and the video playback processes. While the term "video" is used in these sections, it should be understood that the term may include video and/or audio.

In accordance with one aspect, the methods and apparatuses provided herein may be adapted to provide users a user-friendly space in which they may create their own video tracks (user content) to augment the presentation of a packaged movie, or other like reference content. These video tracks can be used to create combined content for both friends (selected users) and/or the community at large. Such combined content may, in certain implementations, take the form of "movie messages" that may be used for user-made commentary, in-movie messaging, relational notes, fan art, fan videos, fan-enhancement, and other like uses.

In certain example implementations, the methods and apparatuses herein may be adapted to provide or otherwise support the creation of videos that may be displayed as a composite on top of an existing packaged movie (e.g., Picture in Picture, etc.), as a simultaneous video feed (e.g., presented on the same screen as the movie or a separate screen/device), and/or as video that will be inserted into the movie's playback (e.g. an interrupt, interlude, etc.).

In certain example implementations, the methods and apparatuses herein may be adapted to provide or otherwise support an integrated system that includes video creation, video storage, video transmission, and/or video playback processes.

In accordance with certain aspects, the methods and apparatuses herein may be adapted to interface with on an existing fundamental architecture for a social networking web service that has the ability to be connected to a website, set-top media players (e.g., Blu-ray player devices, etc.), and/or the like. Such architecture may include, for example, certain features such as inter-network messaging, buddy lists, etc.

An exemplary video for use in such an architecture may include a number of attributes, such as, tags or a collection of access-tags. Such tags may, for example, be managed by the social networking service provider, and include a way to note the video's owner and a list of those intended to be allowed to view the video. This may be useful when considering both privacy concerns and decency concerns. A video's creator may be noted, so that that user may edit and remove the video, including the ability to manage the rest of the video's access-tags. The rest of these tags may be associated with a collection of users who may view the video. A user may select an individual user or groups of users, or select all of their buddies. In the case of 'all buddies', the social networking service may be adapted to actively update such a list to be current with the user's buddy list. In certain implementations, a user may also opt to submit a video for public consumption.

When a user uploads a video, they may be given the option to send a message to one or more other users to inform them of this video's existence. In some implementations, other users may browse videos to which they may have access.

A user-created video may be access-tagged and uploaded to an existing social-networking web-service. Such user content may, for example, be captured live (e.g., via a webcam), and/or uploaded from a previously captured and/or edited source by the user. In certain example implementations, a user may have the ability provide user input (sender input) to select certain video presentation options. For example, a user may choose a location on the screen for the tagged user content as a pop-up, weather or not the tagged user content interrupts the movie (reference content), or appear along side of, or on top of it, etc. In other example implementations, a user may be given the option to 'frame' their video using the images. These and/or other like options may, for example, be presented to the user in a number of ways, and on many devices (computer, player, etc), and make use of the web service framework to further manage the same data.

In one example, a networked laptop may be used in conjunction with a connected Blu-ray player. Here, for example, a user may synchronize both devices, and record himself making a commentary track while a movie plays. A website may be provided or created that gives the user's computer control of the Blu-ray player's playback commands, and will note the player's timecode, and automatically link created video to the appropriate spot in the movie.

In another example, a user may seek to upload a pre-existing video while still connected to a Blu-ray player. In this situation, once the video is uploaded, the user may scrub through the movie on their player, and select the video's start point. The user may then see a live preview of their video (e.g., streaming from the social network service) on top of their player's reference content.

In yet another example, a use may be presented with a computer but no local Blu-ray player. This may, for example, become common in a Kiosk type of display. A user may be presented with a webcam and the ability to record commentary on the fly. The system may be adapted to provide the user with pre-selected popular scenes or other like portions of reference content to choose from, and over/along which to record their user content. In the case of a kiosk or other like device, a reference content owner/manager may choose which movies to provide. In the case of a user's computer being employed, a user may be allowed by a reference content owner/manager to access movies per some account registration agreement or the like.

In certain example implementations, such a system may provide users with sample clips or portions from the movie that will playback as they record their message, and/or still images or frames (e.g., thumbnail images, etc.). In certain example implementations, a reference content owner/manager and/or web service may include a varied sample of a movie to provide context for features such as this one. Thus, a user may preview of user content as overlay or the like (e.g., perhaps presented in a lower resolution format) as generated by the web service and sent to the computer. For example, such a preview of the combined content may be presented in a version as a flash application or the like.

In accordance with certain exemplary aspects, a web application or the like may be adapted to manage the storage of copies of uploaded tagged user content. The videos that users create may have to be encoded into a few different formats. A version for website playback may, for example, be created using flash, etc. Versions for download to. Blu-ray players may, for example, be created using an MPEG-II and/or other like standard, both for download and progressive download for streaming.

There may be varying methods with which a receiver user may initiate playback of combined content. By way of example, if a user has been sent a message notifying them of a new video creation by a sender user, they may choose to view the video within the context of the entire movie, or to view only the portion or portions of the movie that are relevant to the new video created.

With these and other exemplary aspects in mind, attention is drawn to FIG. 1, which illustrates an exemplary implementation of a computing environment 100 that may include various networked computing devices and an electronic entertainment system, and which may be adapted for use in combining and distributing user enhanced video/audio content.

As shown, environment 100 may include an optical disc 102 adapted for use in an electronic entertainment system 104 having an optical disc player device 106 coupled to a video monitor device 108 and audio monitor device 110. In this example, optical disc 102 may include content information 112 and instructional information 114. Electronic entertainment system 104 may, for example, be operatively coupled to communicate with at least one computing device, such as, network resource device 120 through a network 116.

At least a portion of instructional information 114 may be implemented to adapt optical disc player device 106 to support at least a portion of the processes for combining and distributing user enhanced video/audio content as provided herein.

In certain implementations, optical disc 102 and/or other user content may be accessed by a sender user computing device 122. Computing device 122 may, for example, include any computer or other like appliance that may be adapted to support at least a portion of the processes for combining and distributing user enhanced video/audio content as provided herein. For example, computing device 122 may be adapted to access user content and provide tagged user content to network resource device 120. By way of example but not limitation, computing device 122 may include a personal computer, desk top computer, a lap top computer, a camera, a personal digital assistant, a smart phone, a set top box, etc. As illustrated, computing device 122 may be connected to electronic entertainment system 104, and/or network 116.

System 100 may also include one or ore receiver user computing devices 124. Computing device 124 may, for example, include any computer or other like appliance that may be adapted to support at least a portion of the processes for combining and distributing user enhanced video/audio content as provided herein. For example, computing device 124 may access combined content from network resource device 120 through network 116. By way of example but not limitation, computing device 122 may include a personal computer, desk top computer, a lap top computer, a camera, a personal digital assistant, a smart phone, an electronic entertainment system, a set top box, etc.

Network resource device 120 may include one or more computing devices that may be adapted to support at least a portion of the processes for combining and distributing user enhanced video/audio content as provided herein. For example, network resource device 120 may receive tagged user content from one or more other computing devices or the like and provide combined content that may be established based, at least in part, on the tagged user content. The combined content may, for example, be provided (e.g., downloaded, streamed, etc.) to one or more computing devices or the like through network 116.

Figure 2:
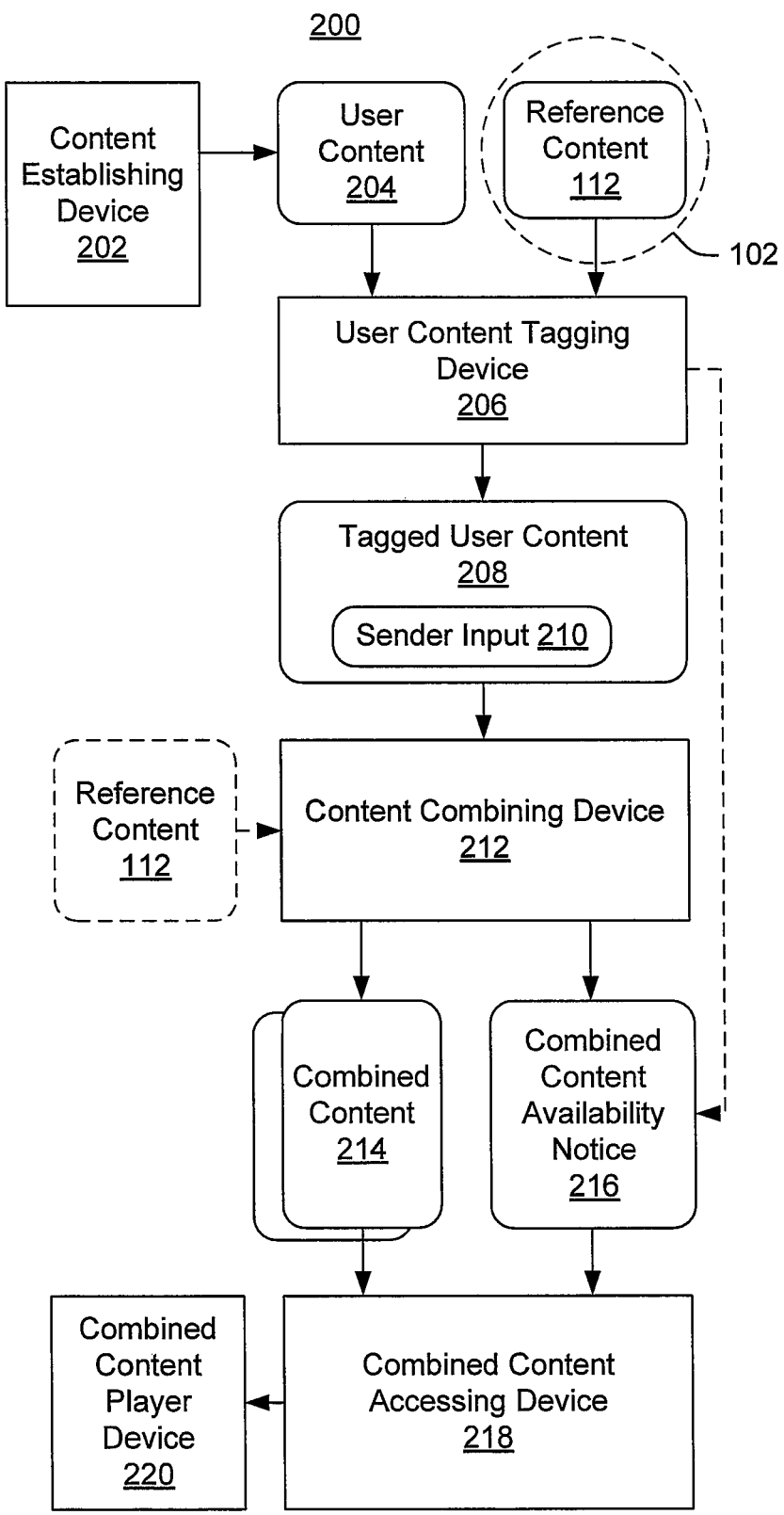
FIG. 2 is a block diagram illustrating certain features of an exemplary system that may be implemented to combine and distribute user enhanced video/audio content.

Attention is drawn next to FIG. 2, which is a block diagram illustrating certain features of an exemplary system 200 that may be implemented to combine and distribute user enhanced video/audio content, for example, as in FIG. 1.

System 200 may include a content establishing device 202. Content establishing device 202 may be adapted to establish user content 204. User content 204 may, for example, include one or more video and/or audio tracks. Content establishing device 202 may include one or more devices for capturing, recording, and/or otherwise generating video and/or audio tracks. By way of example but not limitation, content establishing device 202 may include a camera, a microphone, a computing device, and/or the like. The resulting user content 204 may, for example, be stored on a computer readable medium.

User content 204 may be accessed by a user content tagging device 206. User content tagging device 206 may, for example, include one or more computing devices, an optical disc reading device, and/or the like. User content tagging device 206 may also be adapted to access at least a portion of reference content 112. For example, in certain implementations, reference content 112 may be accessed from an optical disc 102, memory, and/or other like computer readable media. Reference content 112 may include, for example, data associated with at least portion of one or more video and/or audio tracks.

User content tagging device 206 may be adapted to establish tagged user content 208 and/or sender input information 210. For example, user content tagging device 206 may be adapted to establish tagged user content 208 based, at least in part, on at least a portion of user content 204 and/or at least a portion of reference content 112 and/or other information associated with reference content 112. User content tagging device 206 may be adapted to establish sender input information 210 based, at least in part, on user input.

Tagged user content 208 and/or sender input information 210 may be provided to a content combining device 212.

Content combining device 212 may, for example, include one or more computing devices and/or the like. By way of example but not limitation, content combining device 212 may include network resource device 120. Content combining device 212 may be adapted to access at least a portion of reference content 112 (e.g., another copy thereof). Content combining device 212 may be adapted to establish at least one version of combined content 214 (e.g., user enhanced) based, at least in part, on tagged user content 208 and at least a portion of reference content 112. In certain implementations, content combining device 212 may be adapted to establish such combined content 214 based, at least in part, on tagged user content 208, at least a portion of reference content 112, and at least a portion of sender input information 210.

Content combining device 212 may be adapted to provide a combined content availability notice 216 to one or more computing devices. For example, content combining device 212 may be adapted to provide such an availability notice 216 to one or more computing devices based, at least in part, on sender input information 210 and/or tagged user content 208. In certain implementations, user content tagging device 206 may be adapted to provide such an availability notice 216 to one or more computing devices, e.g., as illustrated in FIG. 2 by the dashed line.

As in this illustrated example, such an availability notice 216 may be provided to a combined content accessing device 218, which may include one or more computing devices and/or the like. For example, combined content accessing device 218 may include receiver user computing device 124. Combined content accessing device 218 may be adapted to access combined content 214 and/or otherwise provide such to a combined content player device 220. While illustrated in the example as being separate devices, in certain implementations, combined content accessing device 218 and combined content player device 220 may be implemented using one or more devices.

Combined content player device 220 may, for example include one or more computing devices, entertainment systems, smart phones, MP3 Players, etc., that may be adapted to replay or otherwise reproduce at least a portion of at least one of an audio and/or video track of combined content 214.

In the example system 200 above, user content tagging device 206 may be associated with a first user (e.g., a sender user) and combined content accessing device may be associated with a second user (e.g., a receiver user), and content combining device 212 may be associated with a service provider, web entity, and/or the like. In certain implementations, system 200 and the associated parties (e.g., sender user, receiver user(s), and service provider) may be part of a web-based or other like affiliated community. For example, the users may open accounts and specify other users as "buddies" with whom, through the service provider may share combined content 214.

Figure 3:
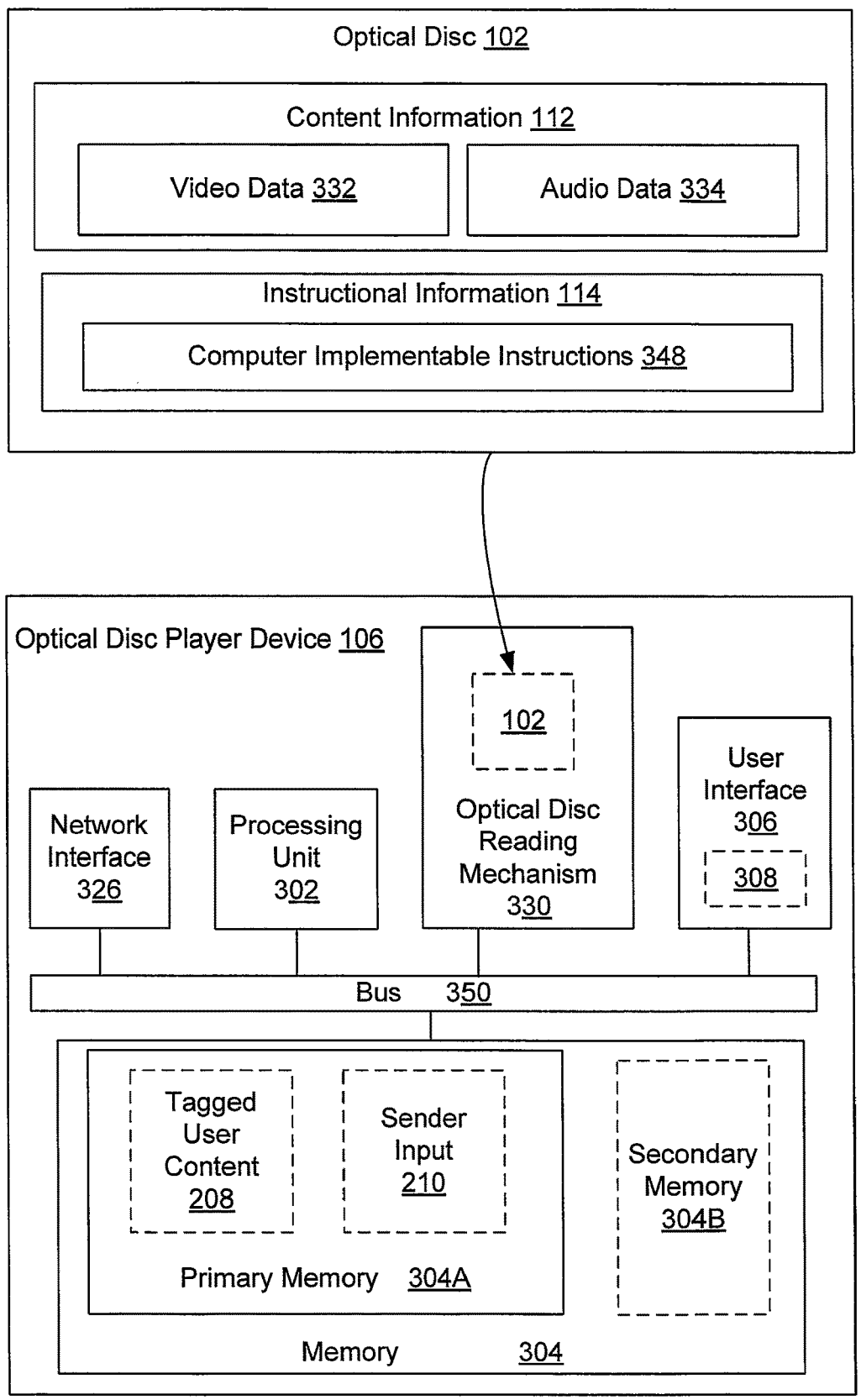
FIG. 3 is a block diagram illustrating certain features of an implementation of an optical disc and an optical disc player device as may be implemented for use in combining and distributing user enhanced video/audio content.

Reference is made next to FIG. 3, which is a block diagram illustrating certain example features that may be implemented in an exemplary optical disc 102 and/or an exemplary optical disc player device 106, and/or implemented to adapt in some manner a function of a computing device such as, e.g., computing devices 122, 124, and/or network resource device 120.

Optical disc player device 106 may, for example, include at least one processing unit 302, some form of a memory 304, at least one user interface 306, an optical disc reading mechanism 330, and a network interface 326. As illustrated in FIG. 3, at least one bus 350 or the like may be adapted to operatively couple two or more of processing unit 302, memory 304, user interface 306, optical disc reading mechanism 330, and/or network interface 326.

As illustrated, optical disc 102 may be operatively coupled to (and accessed through) optical disc reading mechanism 330. Optical disc 102 may have stored thereon content information 112, including video data 332 and audio data 334. Optical disc 102 may, for example, have stored thereon instructional information 114 including computer implementable instructions 348.

Memory 304 may, for example, include primary memory 304A. In certain example implementations memory 304 may also include secondary memory 304B (e.g., a hard disk drive, solid state drive, or other like non-volatile storage devices and/or media).

As shown in FIG. 3, primary memory 304A may include tagged user content 208 and sender input 210 which may be at least a partially associated with user input that may be received through user interface 306. By way of example but not limitation, user interface 306 may include and/or otherwise be operatively coupled to a user input device 308 (e.g., a keypad, a touch screen, a joystick, a mouse, remote control, a camera, a microphone, etc.). In certain exemplary implementations, user interface 306 may include a wireless communication interface adapted to receive wireless signals (not shown) from a remotely controlled user input device 308. Such wireless signals may, for example, include infrared, radio frequency, or other like electromagnetic signals.

While not shown in FIG. 3, optical disc reading mechanism 330 may, for example, include a receptacle adapted for receiving optical disc 102, an optical disc rotation mechanism adapted for rotating optical disc 102, a optical reading mechanism (e.g., a laser read head, etc.) adapted for reading information stored on optical disc 102 in the form of data, and supporting control circuitry adapted for controlling the operation of optical disc reading mechanism 330 and providing the information read from optical disc 102 to at least bus 350.

In certain exemplary implementations, optical disc reading mechanism 330 may be adapted to read one or more of a compact disc (CD), a digital versatile disc (DVD), a Blu-Ray disc, and/or the like. In certain exemplary implementations, optical disc reading mechanism 330 may be adapted to hold and/or otherwise manipulate multiple optical discs. In certain exemplary implementations, optical disc 102 may be adapted as a read only disc, a read/writable disc, a read/rewritable disc, etc. Thus, in certain implementations, optical disc reading mechanism 330 may be adapted to only read from optical disc 102, while in other implementations optical disc reading mechanism 330 may be adapted to read and write to optical disc 102. Such mechanisms and techniques are well known.

Processing unit 302 may, for example, be implemented using hardware, firmware, software, and/or any combination thereof. Processing unit 302 may, for example, be implemented using digital and/or analog circuitry. Processing unit 302 may, for example, be implemented using a central processing unit, a microprocessor, a microcontroller, an application specific integrated circuit (ASIC), a graphical processing unit (GPU), and/or other like circuits.

Figure 6:
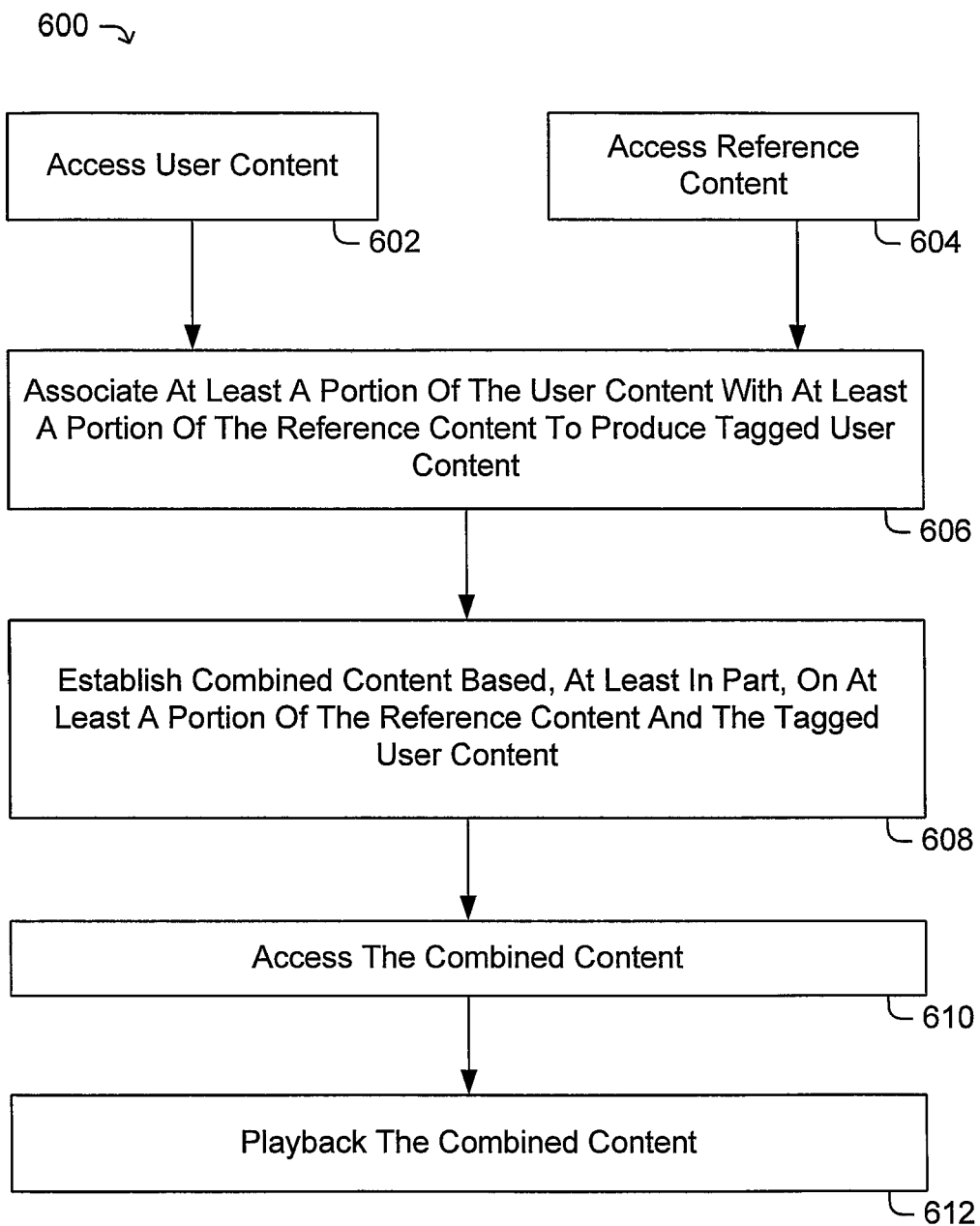
FIG. 6 is a flow diagram illustrating an exemplary implementation of a method that may be adapted for use in combining and distributing user enhanced video/audio content.

Processing unit 302 may include any form of circuitry that may be adapted based, at least in part, on at least a portion of instructional information 114. Processing unit 302 may, for example, be adapted to perform and/or to otherwise support at least a portion one or more of exemplary methods 400 (FIG. 4) and/or 600 (FIG. 6).

Network interface 326 may, for example, include any circuitry adapted to provide for communication with at least network 116. Network interface 326 may, for example, be adapted to provide such communication over one or more wired and/or wireless communication links. Network 116 may, for example, include one or more communication resources adapted to provide communication between network interface 326 and at least one computing device, such as, e.g., network resource device 120.

By way of example but not limitation, in certain implementations, network 116 may include a wired and/or wireless local area network (LAN and/or MILAN), a wired and/or wireless telephone network, the Internet, and/or the like. By way of example but not limitation, in certain implementations, network interface 226 may include a wired and/or wireless modem, an Ethernet interface, a telephone interface, an antenna, a transmitter, a receiver, a transceiver, and/or the like.

Figure 4:
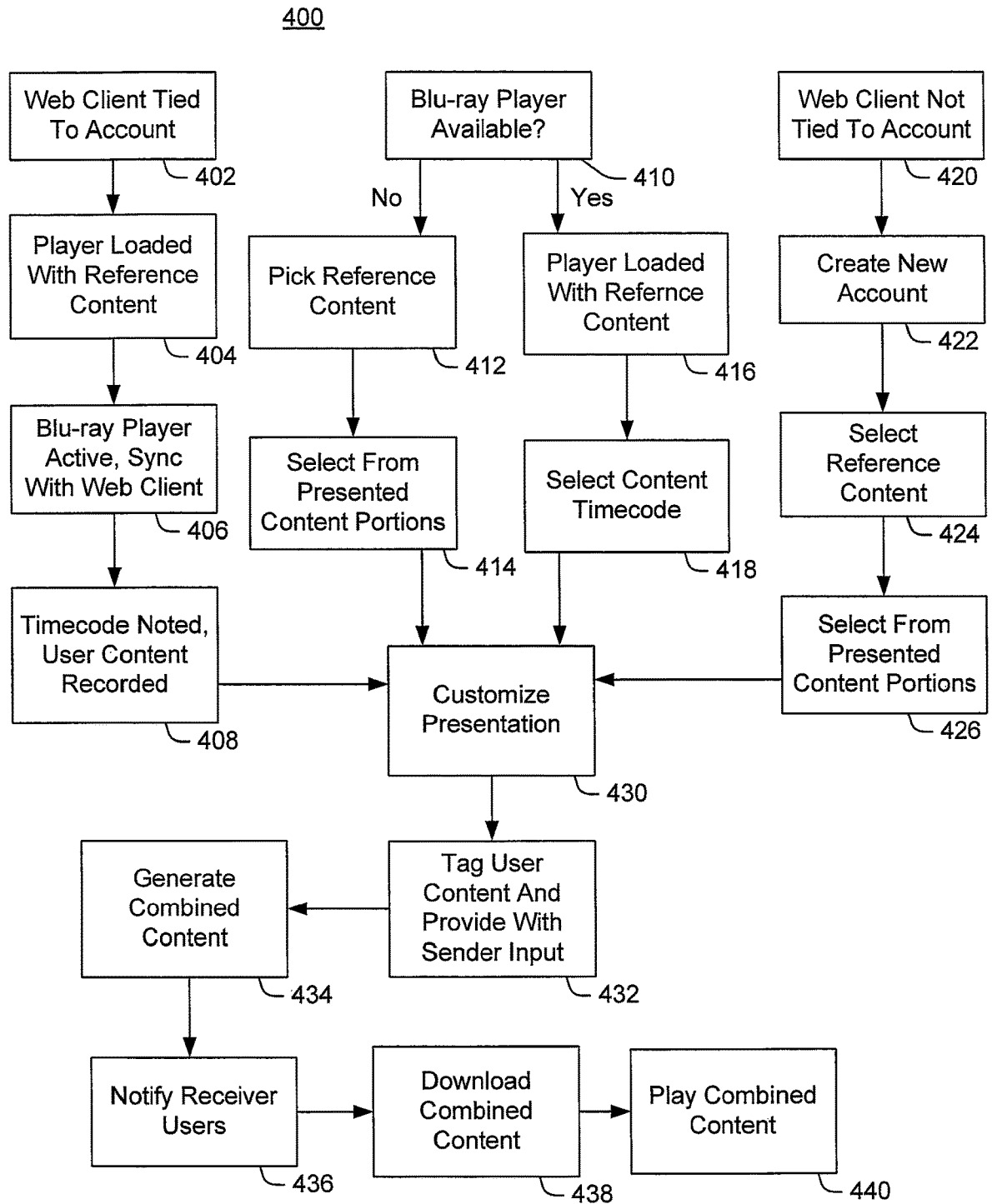
FIG. 4 is a flow diagram illustrating an exemplary implementation of a method that may be adapted for use in combining and distributing user enhanced video/audio content.

Reference is now made to FIG. 4, which is a flow diagram illustrating an exemplary method 400 that may, for example, be adapted for use in combining and distributing user enhanced video/audio content. Method 400 may be implemented to provide for the services presented in the various examples herein.

At block 402, a web client in a computing device or the like associated with a sender user may be tied to an account associated with a service provider or the like. At block 404, a player may be loaded with reference content. At block 406, a Blu-ray player may be activated and synchronized with the web client. At block 408, timecode or other like temporal indicator may be noted and user content recorded or otherwise generated.

At block 410, it may be determined if a Blu-ray player is available. If there is no Blu-ray player, then at block 412 the user may select reference content. At block 414, the user may select from presented content portions, such as, e.g., clips, frames, thumbnails, etc. If at block 410 it is determined that there is a Blu-ray player, then at block 416 a player may be loaded with reference content (e.g., an optical disc). At block 418, at least one content timecode or the like may be selected by user input.

At block 420, a web client may not be tied to a user account. Hence, at block 422 a new user account may be created. At block 424, reference content may be selected. At block 426, the user may select from presented content portions, such as, e.g., clips, frames, thumbnails, etc.

At block 430 the user may provide input to customize a presentation following, either block 408, 414, 418, or 426. At block 432, user content may be tagged and provided along with sender input. At block 434, combined content may be generated.

At block 436, one or more receiver users may be notified that the combined content is available. At block 438, the combined content may be accessed by one or more receiver users, e.g., through download and/or streaming. At block 440, at least a portion of the accessed combined content may be played or otherwise displayed.

Figure 5:
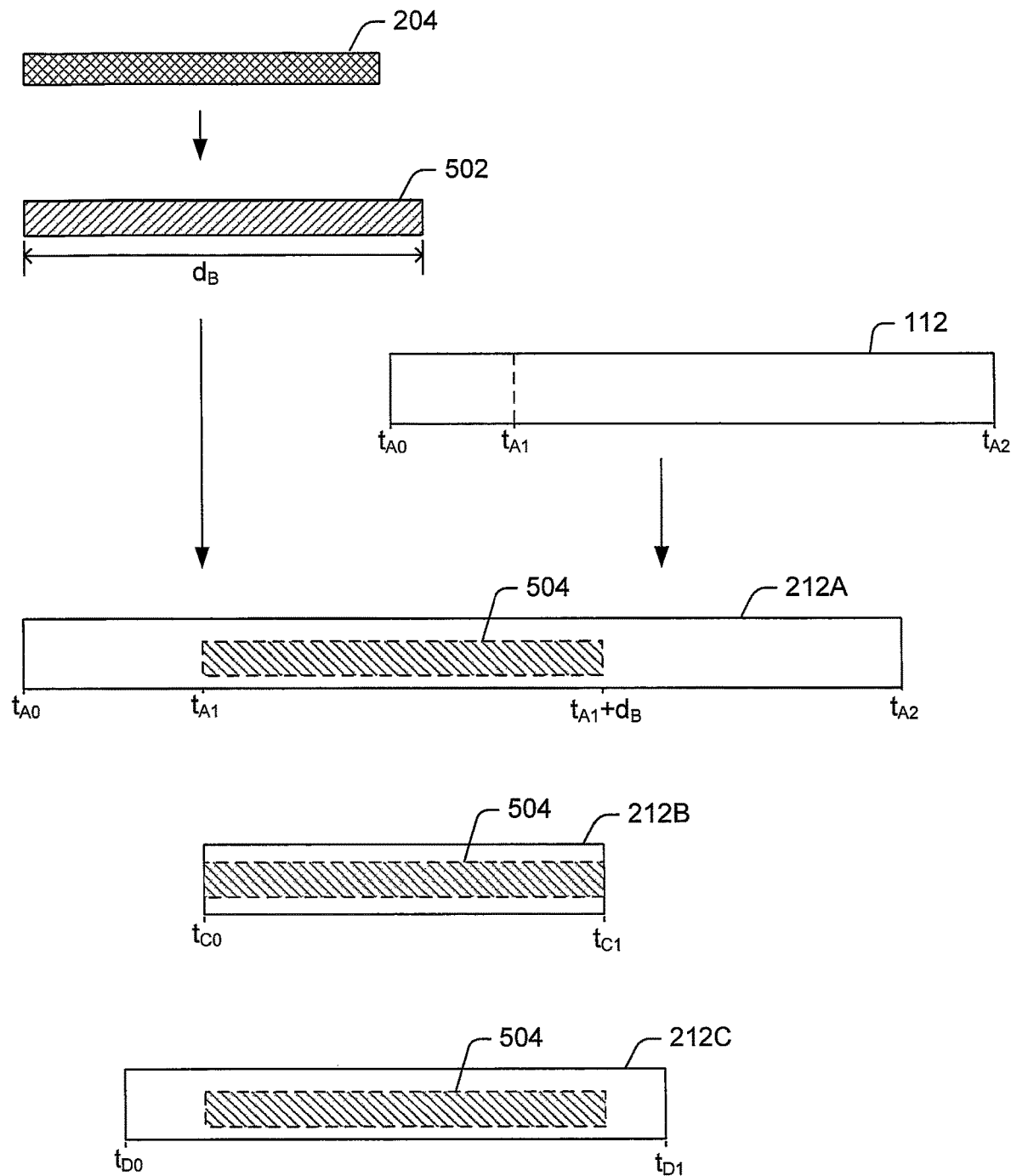
FIG. 5 is a time line diagram illustrating some exemplary representative combined user enhanced video/audio content.

Reference is now made to FIG. 5, which is a time line diagram illustrating some exemplary representative combined user enhanced video/audio content.

Here, for example, user content 204 is illustrated as a track, which may be tagged and/or otherwise adapted in some manner to produce track 502. Track 503 may have duration of $d_B$, for example. Reference content 112 is illustrated as a track that starts at $t_{A0}$ and ends at $t_{A2}$. Here, a user selected timecode or the like is illustrated by the dashed line at $t_{A1}$.

An exemplary combined content 212A is illustrated as a track that starts at $t_{A0}$ and ends at $t_{A2}$, but which also includes user content as combined in some manner at $t_{A1}$ and ending at $t_{A1}+d_B$. Hence, in this example, the combined content is the same length as the reference content.

In other implementations, the combined content may have a shorter or longer length then the reference content. For example, combined content 212B is illustrated as a track that starts at $t_{A1}$ and ends at about $t_{A1}+d_B$, making it about the same length as the tagged user content, and/or user content. In anther example, combined content 2120 is illustrated as a track that starts at $t_{D0}$ and ends at $t_{D1}$, making it the longer than the tagged user content, and/or user content, but shorter than the reference content.

FIG. 6 is a flow diagram illustrating an exemplary implementation of a method 600 that may be adapted for use in combining and distributing user enhanced video/audio content in one or more networked devices. At block 602, user content may be accessed. At block 604, reference content may be accessed. At block 606, at least a portion of the user content may be associated with at least a portion of the reference content to produce tagged user content. At block 608, combined content may be established based, at least in part, on at least a portion of the reference content and the tagged user content. At block 610, at least a portion of the combined content may be accessed. At block 612, at least a portion of the combined content may be played.

While certain exemplary techniques have been described and shown herein using various systems and methods, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

We claim:

1. A computer program product comprising a non-transitory computer readable storage device having a computer readable program stored thereon, wherein the computer readable program when executed on a computer causes the computer to:
    display, at a display device, reference content;
    capture, with an image capture device, a user video that includes live imagery of a user viewing the reference content;
    determine a timecode within the reference content at which the user video is captured;
    link, with a processor of the computer, the user video to the reference content at the timecode;
    generate, with the processor, one or more access-tags that identify one or more additional users that are specified by the user as having permission to view the user video; and
    after capturing the user video, deliver, with the processor, the user video to a social networking service configured to provide the one or more additional users access to a composite of the user video and the reference content based upon the one or more access-tags.

2. The computer program product of claim 1, wherein the composite of the user video and the reference content comprises the user video and an entirety of the reference content.

3. The computer program product of claim 1, wherein the composite of the user video and the reference content comprises the user video and one or more portions of the reference content that are relevant to the user video without one or more portions of the reference content that are irrelevant to the user video.

4. The computer program product of claim 1, wherein the composite of the user video and the reference content comprises the user video being a Picture in Picture within the reference content.

5. The computer program product of claim 1, wherein the composite of the user video and the reference content comprises the user video being inserted as an interlude within the reference content.

6. The computer program product of claim 1, wherein the computer is further caused to capture, with an audio capture device, live audio of the user speaking during the viewing of the reference content.

7. The computer program product of claim 6, wherein the live audio is a user commentary associated with the reference content.

8. The computer program product of claim 1, wherein one or more notifications are received by the one or more additional users from the social networking service, the one or more notifications indicating the user video is available for delivery.

9. The computer program product of claim 1, wherein the access to the composite is provided based further on one or more presentation options specified by the user, the one or more presentation options including one or more of:
    an on-screen location at which to position the user video;
    whether to play back the user video simultaneously with the reference content or as an interlude to the reference content; or
    a desired portion, greater in length than the user video, of the reference content to include in the composite.

10. The computer program product of claim 1, wherein the social networking service is further configured to provide at least a first additional user of the one or more additional users an option to play back an entirety of the reference content with composites from different users at different timecodes within the reference content.

11. A method comprising:
    displaying, at a display device, reference content;
    capturing, with an image capture device, a user video that includes live imagery of a user viewing the reference content;
    determining a timecode within the reference content at which the user video is captured;
    linking, with a processor, the user video to the reference content at the timecode;
    generating, with the processor, one or more access-tags that identify one or more additional users that are specified by the user as having permission to view the user video; and
    after capturing the user video, delivering, with the processor, the user video to a social networking service configured to provide the one or more additional users access to a composite of the user video and the reference content based upon the one or more access-tags.

12. The method of claim 11, wherein the composite of the user video and the reference content comprises the user video and an entirety of the reference content.

13. The method of claim 11, wherein the composite of the user video and the reference content comprises the user video and one or more portions of the reference content that are relevant to the user video without one or more portions of the reference content that are irrelevant to the user video.

14. The method of claim 11, wherein the composite of the user video and the reference content comprises the user video being a Picture in Picture within the reference content.

15. The method of claim 11, wherein the composite of the user video and the reference content comprises the user video being inserted as an interlude within the reference content.

16. The method of claim 11, further comprising capturing, with an audio capture device, live audio of the user speaking during the viewing of the reference content.

17. The method of claim 16, wherein the live audio is a user commentary associated with the reference content.

18. The method of claim 11, wherein one or more notifications are received by the one or more additional users from the social networking service, the one or more notifications indicating the user video is available for delivery.

19. A system comprising:
a display device that displays reference content;
an image capture device that captures a user video that includes live imagery of a user viewing the reference content; and
a processor that determines a timecode within the reference content at which the user video is captured, links the user video to the reference content at the timecode, generates one or more access-tags that identify one or more additional users that are specified by the user as having permission to view the user video, and, after capturing the user video, delivers the user video to a social networking service configured to provide the one or more additional users access to a composite of the user video and the reference content based upon the one or more access-tags.

20. The system of claim 19, further comprising an audio capture device that captures live audio of the user speaking during the viewing of the reference content.

* * * * *

UNITED STATES PATENT AND TRADEMARK OFFICE
CERTIFICATE OF CORRECTION

PATENT NO. : 11,582,507 B2
APPLICATION NO. : 16/450032
DATED : February 14, 2023
INVENTOR(S) : Kyle Prestenback et al.

It is certified that error appears in the above-identified patent and that said Letters Patent is hereby corrected as shown below:

In the Specification

In Column 4, Line 26, delete "to." and insert -- to --.

In Column 5, Line 7, delete "ore" and insert -- more --.

In Column 8, Line 10, delete "MILAN)," and insert -- WLAN), --.

In Column 8, Lines 59-65, delete "Here, for example, user content 204 is illustrated as a track, which may be tagged and/or otherwise adapted in some manner to produce track 502. Track 503 may have duration of $d_B$, for example. Reference content 112 is illustrated as a track that starts at $t_{A0}$ and ends at $t_{A2}$. Here, a user selected timecode or the like is illustrated by the dashed line at $t_{A1}$." and insert the same on Column 8, Line 58, as a continuation of the same paragraph.

In Column 9, Line 9, delete "2120" and insert -- 212C --.

Signed and Sealed this
Twenty-seventh Day of June, 2023

Katherine Kelly Vidal
*Director of the United States Patent and Trademark Office*